United States Patent [19]
Fukuda

[11] Patent Number: 5,040,874
[45] Date of Patent: Aug. 20, 1991

[54] LIQUID CRYSTAL DISPLAY DEVICE HAVING INTERLACED DRIVING CIRCUITS FOR BLACK LINE INTERLEAVE OF A VIDEO SIGNAL

[75] Inventor: Hidenori Fukuda, Yaita, Japan

[73] Assignee: Sharp Kabushiki Kaisha, Japan

[21] Appl. No.: 446,217

[22] Filed: Dec. 5, 1989

[30] Foreign Application Priority Data

Dec. 12, 1988 [JP] Japan ................................ 63-313533

[51] Int. Cl.[5] ................................................ G02F 1/13

[52] U.S. Cl. ...................................... 359/54; 340/784; 358/236; 359/66

[58] Field of Search ............................ 350/333, 339 F; 358/236, 237, 241; 340/784

[56] References Cited

U.S. PATENT DOCUMENTS

| | | | |
|---|---|---|---|
| 4,319,237 | 3/1982 | Matsuo et al. | 340/784 |
| 4,602,292 | 7/1986 | Togashi et al. | 340/784 |
| 4,694,349 | 9/1987 | Takeda et al. | 340/784 |
| 4,763,994 | 8/1988 | Kaneko et al. | 350/333 |
| 4,842,371 | 6/1989 | Yasuda et al. | 350/333 |
| 4,859,997 | 8/1989 | Bouron et al. | 340/783 |
| 4,870,399 | 9/1989 | Carlson | 340/811 |
| 4,932,759 | 6/1990 | Toyono et al. | 350/333 |

FOREIGN PATENT DOCUMENTS

| | | | |
|---|---|---|---|
| 61-231526 | 10/1986 | Japan | 350/333 |
| 61-243429 | 10/1986 | Japan | 350/333 |
| 62-156623 | 7/1987 | Japan | 350/333 |
| 62-156624 | 7/1987 | Japan | 350/333 |
| 63-18331 | 1/1988 | Japan | 350/333 |

*Primary Examiner*—Rolf Hille
*Assistant Examiner*—Minhloan Tran
*Attorney, Agent, or Firm*—Merchant, Gould, Smith, Edell, Welter & Schmidt

[57] ABSTRACT

A liquid crystal display panel comprising pixels in odd-numbered lines and even-numbered lines corresponding respectively to odd-numbered lines and even-numbered lines of a video signal. During the odd-numbered field, a video signal for the odd-numbered field is supplied to the pixels in the odd-numbered lines and a black-level signal is supplied to the pixels in the even-numbered lines, whereby the image of the odd-numbered field can be displayed by the pixels in the odd-numbered lines while a black image can be displayed by the pixels in the even-numbered lines. During the even-numbered field, a video signal for the even-numbered field is supplied to the pixels in the even-numbered lines and a black-level signal is supplied to the pixels in the odd-numbered lines, whereby the image of the even-numbered field can be displayed by the pixels in the even-numbered lines while a black image can be displayed by the pixels in the odd-numbered lines.

7 Claims, 3 Drawing Sheets

LIQUID CRYSTAL DISPLAY DEVICE HAVING INTERLACED DRIVING CIRCUITS FOR BLACK LINE INTERLEAVE OF A VIDEO SIGNAL

BACKGROUND OF THE INVENTION

1. Field of the Invention

The present invention relates to a liquid crystal display panel of a type having lines of pixels equal in number to the number of frame lines of a video signal.

2. Description of the Prior Art

There is known an active matrix liquid crystal display panel of a type wherein, for example, in order to improve a vertical image resolution, pixels are employed in a number of lines equal to the number of frame lines of a video signal so that an image for odd-numbered lines can be displayed by pixels for the odd-numbered lines while an image for even-numbered lines can be displayed by pixels for the even-numbered lines.

According to the prior art active matrix liquid crystal display panel, unless image contents at the respective pixels are rewritten, the image contents are retained. Accordingly, when the current field of image is to be displayed by means of pixels for the odd-numbered or even-numbered lines, the preceding field of image is displayed by means of pixels for the even-numbered or odd-numbered lines, respectively, and, therefore, the picture being displayed tends to be blemished. Also, since the image contents are rewritten at one frame cycle, flickering tends to occur, making the displayed picture hard to look at.

For example, FIG. 4 illustrates a standard NTSC video signal including odd and even numbered fields corresponding to odd and even numbered lines of a video display. It is standard in video broadcasting to transmit thirty complete pictures, or frames, per second with each frame made up of 525 lines. However, the lines are not scanned from the top of the display to the bottom sequentially. Studies have shown that a display scanned in this manner would appear to flicker. Rather, 262.5 lines are scanned from top to bottom in a first vertical scan followed by a second top to bottom scan that covers the inbetween lines missed in the first scan. This method of first covering the odd-numbered lines and then returning to cover the even-numbered lines is referred to as interlaced scanning. As shown in FIG. 4, the odd-numbered field of a frame is transmitted prior to the even-numbered field. This leads to a problem in liquid crystal panels used to display video signals.

In typical active matrix liquid crystal display panels, a row of pixel elements corresponds to a line of video. Accordingly, during the odd-numbered field of a video frame, video corresponding to the first line is written to pixels in the first row of the matrix, video corresponding to the third line is written to the third row of the matrix and so on down the matrix. During this time the information previously written to the even rows of pixels continues to be displayed by those pixels.

Likewise, during the even-numbered field of a video frame, video corresponding to the second line is written to pixels in the second row of the matrix, video corresponding to the fourth line is written to the fourth row of the matrix and so on down the matrix. During this time the information previously written to the odd rows of pixels continues to be displayed by those pixels.

Since the previous field information continues to be displayed, for part of every frame period the even numbered field of one frame is displayed with the odd numbered field of the next frame. This can lead to blemishes in the displayed image. Also, since the image contents are rewritten at one frame cycle, flickering tends to occur, making the displayed picture hard to look at.

In view of the foregoing, an attempt has been made to provide a system wherein one and the same image is displayed by means of pixels for each neighboring lines while an image for the odd-numbered field and an image for the even-numbered field are displayed having been displaced one line period so that the respective images of the odd-numbered and even-numbered fields can be displayed alternately at one field period with the use of the respective pixels for the odd-numbered and even-numbered lines.

According to such a display system, the image of the current field and the image of the preceding field are simultaneously displayed and, therefore, the displayed image would not be blemished. Also, since the image contents are rewritten for each field period, no flickering would occur.

However, since the same image may be displayed by the pixels in the neighboring two lines, the image displayed tends to be lower in vertical image resolution.

Two different methods have been suggested in U.S. Pat. No. 4,842,371 issued to Yasuda et al. One method disclosed by Yasuda et al. stores the odd numbered field information received from the video signal into memory while scanning the odd rows of the matrix with the odd numbered field information and even rows of the matrix with the even numbered field information stored from the previous frame. Thus lines one and two are updated at the same time, followed by lines three and four, and so on down the display. In the next half cycle, the even numbered field information is stored while the matrix is again fully scanned both with the even numbered rows getting the even numbered field information and with the odd numbered rows getting the odd numbered field information stored from the same frame. This effectively doubles the refresh rate of the display, gives full vertical resolution and effectively reduces flicker. This method would, however, exhibit some of the blemishing mentioned above.

A second method disclosed by Yasuda et al. involves assuming that intermediate points of a scan line can be used to approximate the state of the next row of pixels. Pixel elements for even numbered rows are shifted to fall between pixel elements for odd numbered rows. During the odd numbered field of a video signal the intensity information that is to be written into adjacent pixels in an odd numbered row is averaged and the result written to the pixel that lies between and below them in the next (even numbered) row. Likewise, during the even numbered field of a video signal the intensity information that is to be written into adjacent pixels in an even numbered row is averaged and the result written to the pixel that lies between and below them in the next (odd numbered) row. As in the previous method, this method writes data to each pixel twice in a frame cycle. This effectively doubles the refresh rate of the display, reduces blemishing and effectively reduces flicker. However since, like the first method mentioned, the same image may be displayed by the pixels in two neighboring lines, the image displayed tends to be lower in vertical resolution.

SUMMARY OF THE INVENTION

Accordingly, the present invention has been devised with a view to substantially eliminating the above discussed problem and has for its essential object to provide an improved liquid crystal display panel substantially free from the above discussed problem.

In order to accomplish the above described object, the present invention provides a liquid crystal display panel of a type having pixels in odd-numbered lines and even-numbered lines corresponding respectively to odd-numbered lines and even-numbered lines of a video signal, wherein during the odd-numbered field, a video signal for the odd-numbered field is supplied to the pixels in the odd-numbered lines and a black-level signal is supplied to the pixels in the even-numbered lines while, during the even-numbered field, a video signal for the even-numbered field is supplied to the pixels in the even-numbered lines and a black-level signal is supplied to the pixels in the odd-numbered lines.

According to the present invention, during the odd-numbered field, the image of the odd-numbered field can be displayed by the pixels in the odd-numbered lines while a black image can be displayed by the pixels in the even-numbered lines. On the other hand, during the even-numbered field, the image of the even-numbered field can be displayed by the pixels in the even-numbered lines while a black image can be displayed by the pixels in the odd-numbered lines. Therefore, the image of the current field and the image of the preceding field will not be displayed simultaneously by the pixels in the odd-numbered and even-numbered lines and, accordingly, the resultant image will not become blemished. Also, since the image contents of the pixels in the odd-numbered and even-numbered lines are rewritten for each field period, no flickering will occur. Moreover, since it is not of a type wherein the same image is displayed by the pixels in the neighboring two lines, no reduction in vertical image resolution will occur.

BRIEF DESCRIPTION OF THE DRAWINGS

This and other objects and features of the present invention will become clear from the following description taken in conjunction with preferred embodiments thereof with reference to the accompanying drawings, in which.

DETAILED DESCRIPTION OF THE EMBODIMENT

Figure 1:
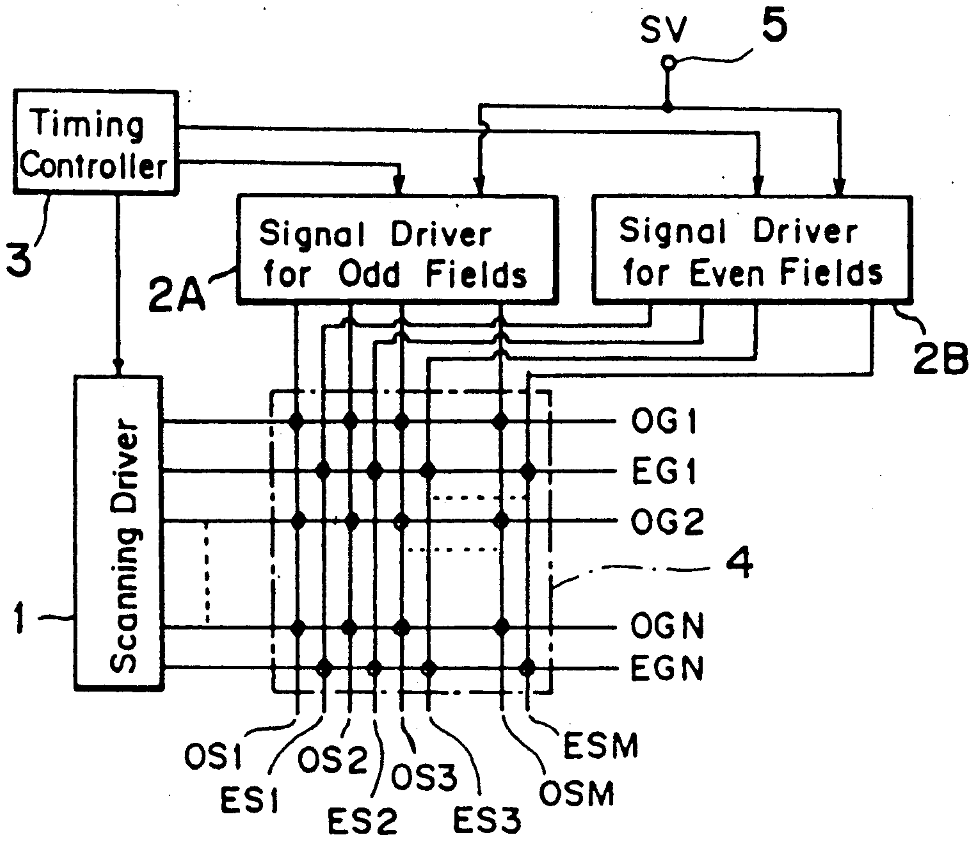
FIG. 1 is a block diagram showing a liquid crystal display panel according to a preferred embodiment of the present invention.

Referring first to FIG. 1 showing a first preferred embodiment of the present invention, reference numeral 1 represents a scanning driver; reference numeral 2A represents an odd-numbered field signal driver; reference numeral 2B represents an even-numbered field signal driver; and reference numeral 3 represents a controller for generating various timing signals necessitated by the drivers 1, 2A and 2B. A liquid crystal matrix array is generally identified by 4 and includes pluralities of scanning electrodes OG1, OG2, . . . and OGN and signal electrodes OS1, OS2, . . . and OSM for odd-numbered lines and pluralities of scanning electrodes EG1, EG2, . . . and EGN and signal electrodes ES1, ES2, . . . and ESM for even-numbered lines. The scanning electrodes OG1, OG2, . . . and OGN and the signal electrodes OS1, OS2, . . . and OSM are connected with gates and sources of thin-film field-effect transistors (TFT) which form respective pixels in the odd-numbered lines, whereas the scanning electrodes EG1, EG2, . . . and EGN and the signal electrodes ES1, ES2, . . . and ESM are connected with gates and sources of thin-film field-effect transistors which form respective pixels in the even-numbered lines. It is to be noted that, for the purpose of brevity, the thin-film field-effect transistors and common electrodes are not illustrated in the drawings and that each pixel is indicated by a respective circle within the block representing the liquid crystal matrix array 4.

The scanning driver 1 has a plurality of output terminals which are connected respectively with the scanning electrodes OG1, EG1, . . . OGN and EGN in the liquid crystal matrix array 4; the signal driver 2A has a plurality of output terminals which are connected respectively with the signal electrodes OS1, OS2, . . . and OSM in the liquid crystal matrix array 4; and the signal driver 2B has a plurality of output terminals which are connected respectively with the signal electrodes ES1, ES2, . . . and ESM in the liquid crystal matrix array 4.

Each of the signal drivers 2A and 2B is adapted to receive a video signal SV from an input terminal 5. In this case, since the liquid crystal itself is designed to be driven by an alternating current, the video signal supplied to each of the signal drivers 2A and 2B has its polarity reversed for a predetermined cycle, for example, for each horizontal period. In such case, the maximum positive and negative levels of the video signal SV represent a black level.

During the odd-numbered field, for each line, video signals at respective sampling points for each line are outputted to the plural output terminals of the signal driver 2A. As the video signals at the sampling points for each line are sequentially outputted, sequential scanning signals are outputted to the plural output terminals of the scanning driver 1 corresponding to the scanning electrodes OG1, OG2, . . . and OGN in the liquid crystal matrix array 4. Also, during the odd-numbered field, black level signals are outputted to the plural output terminals of the signal driver 2B. Then, sequential scanning signals are outputted for each line to the plural output terminals of the scanning driver 1 corresponding to the scanning electrodes EG1, EG2, . . . and EGN in the liquid crystal matrix array 4. Accordingly, the video signals for odd-numbered fields are sequentially supplied to and written in the pixels in the odd-numbered lines in the liquid crystal matrix array 4 and, at the same time, the black level signals are sequentially supplied to and written in the pixels in the even-numbered lines. In other words, for each line, the pixels in the neighboring odd-numbered and even-numbered lines are simultaneously selected with the video signal for the odd-numbered fields being written in the former and with the black level signal being written in the latter.

On the other hand, during the even-numbered field, the black level signals are outputted to the plural output terminals of the signal driver 2A. And, for each line, the sequential scanning signals are outputted to the plural output terminals of the scanning driver 1 corresponding to the scanning electrodes OG1, OG2, . . . and OGN in the liquid crystal matrix array 4. During this even-numbered field, for each line, video signals at respective sampling points for each line are outputted to the plural output terminals of the signal driver 2B. As the video signals at the sampling points for each line are sequentially outputted, sequential scanning signals are outputted to the plural output terminals of the scanning driver 1 corresponding to the scanning electrodes EG1, EG2, . . . and EGN in the liquid crystal matrix array 4. Accordingly, the black level signals are sequentially supplied to and written in the pixels in the odd-numbered lines and the video signals for even-numbered fields are sequentially supplied to and written in the pixels in the even-numbered lines in the liquid crystal matrix array 4. In other words, for each line, the pixels in the neighboring add-numbered and even-numbered lines are simultaneously selected with the black level signal being written in the former and with the video signal for the even-numbered fields being written in the latter.

Figure 2:
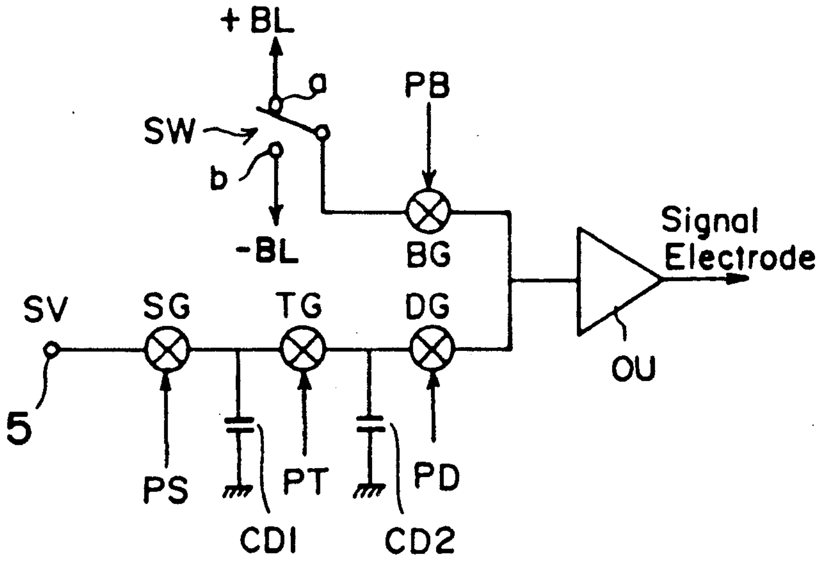
FIG. 2 is a circuit diagram showing a portion of the liquid crystal display panel which is associated with an output terminal of one of signal drivers.

FIG. 2 illustrates a portion associated with one of the respective output terminals of the signal drivers 2A and 2B.

Referring now to FIG. 2, the video signal SV supplied through the input terminal 5 is supplied to a gating circuit SG to which a gating signal PS is also supplied from the controller 3 at a timing corresponding to the sampling point. The video signal gated by the gating circuit SG is retained in a capacitor CD1. The signal retained in this capacitor CD1 is also supplied to a gating circuit TG to which a gating signal PT is also supplied from the controller 3 at a timing at which the sampling of one line finishes. The signal gated by this gating circuit TG is retained in a capacitor CD2. The signal retained in the capacitor CD2 is also supplied to a gating circuit DG.

A changeover switch SW has a movable contact and a pair of fixed contacts a and b, the fixed contact a being connected with a source of a direct current voltage +BL while the fixed contact b is connected with a source of a direct current voltage −BL. These DC voltages +BL and −BL represent respective black level signals corresponding respectively to the polarities of the video signal SV. This changeover switch SW has its movable contact selectively engaged to one of the fixed terminals a and b depending on change in polarity of the video signal SV. A signal emerging from this changeover switch SW is supplied to a gating circuit BG.

Thus, so far as the signal driver 2A is concerned, during the odd-numbered field, a gating signal PD is supplied for each line from the controller 3 to the gating circuit DG and the video signal for the odd-numbered field retained in the capacitor CD2 is supplied to an output stage OU through the gating circuit DG. Also, in the signal driver 2A, during the even-numbered field, a gating signal PB is supplied from the controller 3 to the gating circuit BG and the black level signal outputted from the changeover switch SW is supplied to the output stage OU through the gating circuit BG.

Also, so far as the signal driver 2B is concerned, during the odd-numbered field, the gating signal PB is supplied from the controller 3 to the gating circuit BG and the black level signal outputted from the changeover switch SW is supplied to the output stage OU through the gating circuit BG. Also, in the signal driver 2B, during the even-numbered field, the gating signal PD is supplied from the controller 3 to the gating circuit DG and the video signal of the even-numbered field retained in the capacitor CD2 is supplied to the output stage OU through the gating circuit DG.

Thus, in the illustrated embodiment of the present invention, since the video signals of the odd-numbered fields are supplied to the pixels in the odd-numbered lines in the liquid crystal matrix array 4, the image of the odd-numbered fields can be displayed through the pixels in the odd-numbered lines. Also, since at this time the black level signals are supplied to the pixels in the even-numbered lines in the liquid crystal matrix array 4, a black image can be displayed through the pixels in the even-numbered lines. On the other hand, during the even-numbered fields, the video signals of the even-numbered fields are supplied to the pixels in the even-numbered lines in the liquid crystal matrix array 4 and, therefore, the image of the even-numbered fields can be displayed through the pixels in the even-numbered lines. On the other hand, since the black level signals are supplied to the pixels in the odd-numbered lines in the liquid crystal matrix array 4, the black image can be displayed through the pixels in the odd-numbered lines in the liquid crystal matrix array 4.

Thus, according to the present invention, the image of the current field and the image of the preceding field will not be displayed simultaneously through the pixels in the odd-numbered lines and the even-numbered lines in the liquid crystal matrix array 4, the displayed image will not become blemished. Also, image contents at the pixels in the odd-numbered and even-numbered lines in the liquid crystal matrix array 4 are rewritten for each field period, no flickering will occur. Moreover, since the same image are not displayed through the pixels in the neighboring two lines, no reduction in vertical image resolution will occur.

Hereinafter, a second preferred embodiment of the present invention will now be described with particular reference to FIG. 3. While parts shown in FIG. 3 which are alike to those shown in FIG. 1 are designated by like reference numerals, the second preferred embodiment of the present invention is featured in that only one signal driver is employed.

Figure 3:
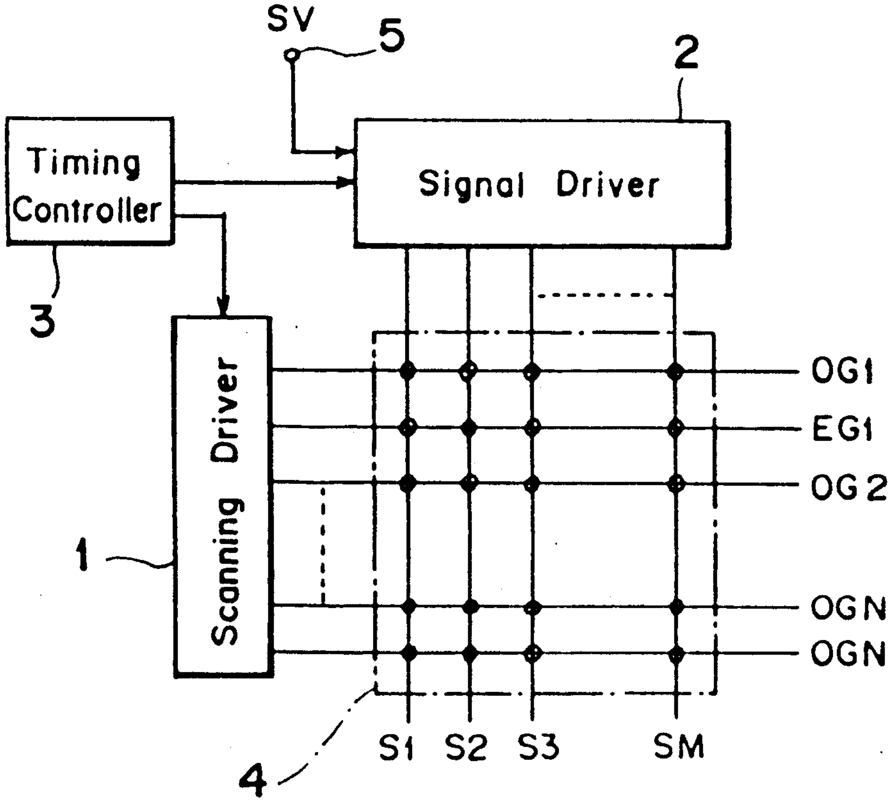
FIG. 3 is a block diagram showing another preferred embodiment of the present invention.
Figure 4:
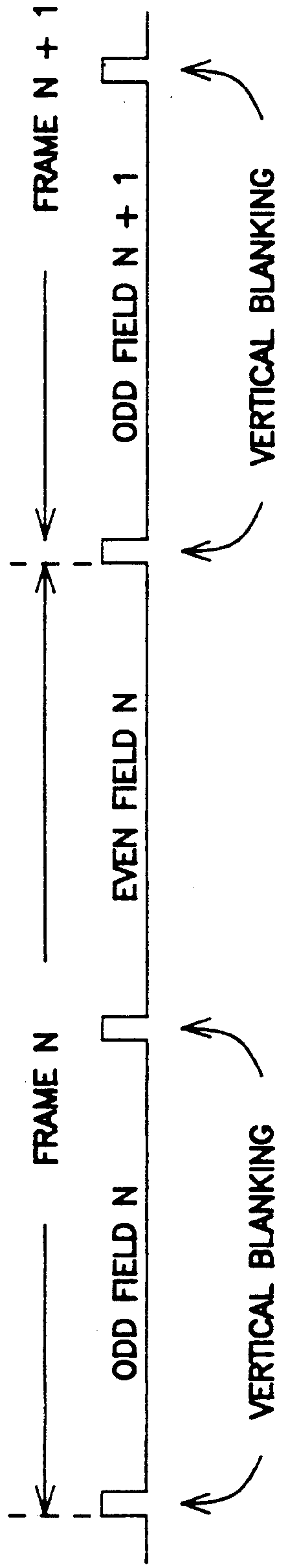
Fig. 4 PRIOR ART
FIG. 4 is a representation of a standard NTSC video signal including odd and even numbered fields corresponding to odd and even numbered lines of a video display.

Referring now to FIG. 3, reference numeral 1 represents a scanning driver; reference numeral 2 represents a signal driver; and reference numeral 3 represents a controller for generating various timing signals necessitated by the scanning and signal drivers 1 and 2. A liquid crystal matrix array is generally identified by 4 and includes a plurality of scanning electrodes OG1, OG2, . . . and OGN for odd-numbered lines, and a plurality of scanning electrodes EG1, EG2, . . . and EGN for even-numbered lines and a plurality of signal electrodes S1, S2, . . . and SM. The scanning electrodes OG1, OG2, . . . and OGN and the signal electrodes S1, S2, . . . and SM are connected with gates and sources of thin-film field-effect transistors (TFT) which form respective pixels in the odd-numbered lines, whereas the scanning electrodes EG1, EG2, . . . and EGN and the signal electrodes S1, S2, . . . and SM are connected with gates and sources of thin-film field-effect transistors which form respective pixels in the even-numbered lines. It is to be noted that, for the purpose of brevity, the thin-film field-effect transistors and common electrodes are not illustrated in the drawings and that each pixel is indicated by a respective circle within the block representing the liquid crystal matrix array 4.

The scanning driver 1 has a plurality of output terminals which are connected respectively with the scanning electrodes OG1, EG1, . . . OGN and EGN in the liquid crystal matrix array 4; and the signal driver 2 has a plurality of output terminals which are connected respectively with the signal electrodes S1, S2, . . . and SM in the liquid crystal matrix array 4.

The signal driver 2 is adapted to receive a video signal SV from an input terminal 5. In this case, since the liquid crystal itself is designed to be driven by an alternating current, the video signal supplied to the signal driver 2 has its polarity reversed for a predetermined cycle, for example, for each horizontal period. In such case, the maximum level of the absolute value of the video signal SV represents a black level.

During the odd-numbered field, for each line, both of the video signals at respective sampling points for each line and the black level signals are continuously outputted to the plural output terminals of the signal driver 2. As the video signals at the sampling points for each line are sequentially outputted, sequential scanning signals are outputted to the plural output terminals of the scanning driver 1 corresponding to the scanning electrodes OG1, OG2, . . . and OGN in the liquid crystal matrix array 4 and, as the black level signals are sequentially outputted to the plural output terminals of the signal driver 2, sequential scanning signals are outputted for each line to the plural output terminals of the scanning driver 1 corresponding to the scanning electrodes EG1, EG2, . . . and EGN in the liquid crystal matrix array 4. Accordingly, the video signals for odd-numbered fields are sequentially supplied to and written in the pixels in the odd-numbered lines in the liquid crystal matrix array 4 and, at the same time, the black level signals are sequentially supplied to and written in the pixels in the even-numbered lines. In other words, for each line, the pixels in the neighboring odd-numbered and even-numbered lines are simultaneously selected during one scanning period with the video signal for the odd-numbered fields being written in the former and with the black level signal being written in the latter.

On the other hand, during the even-numbered field, both of the black level signals and the video signals at the sampling points for one line are continuously outputted to the plural output terminals of the signal driver 2. And, as the black level signals are sequentially outputted, the sequential scanning signals are outputted to the plural output terminals of the scanning driver 1 corresponding to the scanning electrodes OG1, OG2, . . . and OGN in the liquid crystal matrix array 4 and, as the video signals at the sampling points for each line are sequentially outputted, sequential scanning signals are outputted for each line to the plural output terminals of the scanning driver 1 corresponding to the scanning electrodes EG1, EG2, . . . and EGN in the liquid crystal matrix array 4. Accordingly, the black level signals are sequentially supplied to and written in the pixels in the odd-numbered lines and the video signals for even-numbered fields are sequentially supplied to and written in the pixels in the even-numbered lines in the liquid crystal matrix array 4. In other words, for each line, the pixels in the neighboring odd-numbered and even-numbered lines are simultaneously selected during one scanning period with the black level signal being written in the former and with the video signal for the even-numbered fields being written in the latter.

It is to be noted that a portion associated with one of the output terminals of the signal driver 2 is constructed in a manner similar to that shown in FIG. 2 as is the case with any one of the signal drivers 2A and 2B shown in FIG. 1.

In such case, during the odd-numbered field, the gating signals PD and PB are continuously supplied from the controller 3 to the gating circuits DG and BG for each line. The video signal for the odd-numbered field retained in the capacitor CD2 is first supplied to the output stage OU through the gating circuit DG, followed by the supply of the black level signal to the output stage OU through the changeover switch SW and then through the gating circuit BG.

On the other hand, during the even-numbered field, the gating signals PB and PD are continuously supplied from the controller 3 to the gating circuits BG and DG for each line. Then, the black level signal is first supplied to the output stage OU through the changeover switch SW and then through the gating circuit BG, followed by the supply of the video signal for the even-numbered field, retained in the capacitor CD2, to the output stage OU through the gating circuit DG.

Thus, in the illustrated embodiment of the present invention, since the video signals of the odd-numbered fields are supplied to the pixels in the odd-numbered lines in the liquid crystal matrix array 4, the image of the odd-numbered fields can be displayed through the pixels in the odd-numbered lines. Also, since at this time the black level signals are supplied to the pixels in the even-numbered lines in the liquid crystal matrix array 4, a black image can be displayed through the pixels in the even-numbered lines. On the other hand, during the even-numbered fields, the video signals of the even-numbered fields are supplied to the pixels in the even-numbered lines in the liquid crystal matrix array 4 and, therefore, the image of the even-numbered fields can be displayed through the pixels in the even-numbered lines. On the other hand, since the black level signals are supplied to the pixels in the odd-numbered lines in the liquid crystal matrix array 4, the black image can be displayed through the pixels in the odd-numbered lines in the liquid crystal matrix array 4.

Thus, even in the second preferred embodiment of the present invention, since the image can be displayed in a manner similar to that in the first preferred embodiment, effects similar to those afforded by the liquid crystal display panel according to the first preferred embodiment can be obtained. Also, according to the second preferred embodiment of the present invention, the liquid crystal display panel can be fabricated with the use of the single signal driver and, therefore, the circuit can be made simple.

From the foregoing description of the present invention, it is clear that, since the image of the current field and the image of the preceding field will not be displayed simultaneously through the pixels in the odd-numbered lines and the even-numbered lines, the displayed image will not become blemished. Also, since the image contents at the pixels in the odd-numbered and even-numbered lines in the liquid crystal matrix array 4 are rewritten for each field period, no flickering will occur. Moreover, since the same image is not displayed through the pixels in the neighboring two lines, no reduction in vertical image resolution will occur. Accordingly, the utilization of the liquid crystal display panel according to the present invention makes it possible to considerably improve the quality of the image being displayed.

Although the present invention has been fully described in connection with the preferred embodiments thereof with reference to the accompanying drawings, it is to be noted that various changes and modifications are apparent to those skilled in the art without departing from the scope of the present invention as defined by the appended claims. Accordingly, such changes and modifications are to be understood as included within the scope of the present invention unless they depart therefrom.

What is claimed is:

1. A liquid crystal display panel which comprises:

a plurality of pixels in odd-numbered lines and even-numbered lines corresponding respectively to odd-numbered lines and even-numbered lines of a video signal; and signal driver means for supplying, during an odd-numbered field, a video signal for the odd-numbered field to the pixels in the odd-numbered lines and a black-level signal to the pixels in the even-numbered lines and for supplying, during an even-numbered field, a video signal for the even-numbered field to the pixels in the even-numbered lines and a black-level signal to the pixels in the odd-numbered lines.

2. The device as claimed in claim 1, wherein a plurality of signal drivers provide the signal driver means for supplying the video signal and the black-level signal to the odd- and even-numbered lines.

3. The device as claimed in claim 1, wherein a single signal driver provides the signal driver means for supplying the video signal and the black-level signal to the odd- and even-numbered lines.

4. A liquid crystal display panel which comprises:

a plurality of pixels in odd-numbered lines and even-numbered lines corresponding respectively to odd-numbered lines and even-numbered lines of a video signal; and signal driver means for supplying a signal to the pixels in the odd-numbered lines while supplying a black-level signal to the pixels in the even-numbered lines and for supplying a signal to the pixels in the even-numbered lines while supplying a black-level signal to the pixels in the odd-numbered lines.

5. The device as claimed in claim 4, wherein a plurality of signal drivers provide the signal driver means for supplying the signal and the black-level signal to the odd- and even-numbered lines.

6. The device as claimed in claim 4, wherein a single signal driver provides the signal driver means for supplying the signal and the black-level signal to the odd- and even-numbered lines.

7. The method of displaying a video signal on a liquid crystal display panel having a plurality of pixels in odd-numbered lines and even-numbered lines corresponding respectively to odd-numbered lines and even-numbered lines of a video signal, comprising the steps of:

supplying, during an odd-numbered field, a video signal for the odd-numbered field to the pixels in the odd-numbered lines and a black-level signal to the pixels in the even-numbered lines; and supplying, during an even-numbered field, a video signal for the even-numbered field to the pixels in the even-numbered lines and a black-level signal to the pixels in the odd-numbered lines.

* * * * *